US009175839B2

(12) United States Patent
Oquendo, Jr. et al.

(10) Patent No.: US 9,175,839 B2
(45) Date of Patent: Nov. 3, 2015

(54) UNIVERSAL MOUNTING SYSTEM FOR A LIGHT FIXTURE

(71) Applicant: Energy Planning Associates Corp., Sanford, FL (US)

(72) Inventors: Saturnino Oquendo, Jr., Sanford, FL (US); Adam Perdue, Sanford, FL (US)

(73) Assignee: ENERGY PLANNING ASSOCIATES CORP., Sanford, FL (US)

( * ) Notice: Subject to any disclaimer, the term of this patent is extended or adjusted under 35 U.S.C. 154(b) by 191 days.

(21) Appl. No.: 13/887,597

(22) Filed: May 6, 2013

(65) Prior Publication Data
US 2014/0328070 A1 Nov. 6, 2014

(51) Int. Cl.
| F21V 19/02 | (2006.01) |
| F21V 21/116 | (2006.01) |
| F21V 21/30 | (2006.01) |
| F21V 23/00 | (2015.01) |
| F21V 21/10 | (2006.01) |

(52) U.S. Cl.
CPC .............. *F21V 21/116* (2013.01); *F21V 21/30* (2013.01); *F21V 23/001* (2013.01); *F16M 2200/024* (2013.01); *F21V 21/10* (2013.01)

(58) Field of Classification Search
CPC ....... F21V 21/30; F21V 21/116; F21V 21/10; F21V 23/001; F21V 21/02; F16M 2200/024
USPC .............. 248/274.1, 292.12, 220.21, 220.22, 248/222.52; 362/427, 418, 432, 382, 396
See application file for complete search history.

(56) References Cited

U.S. PATENT DOCUMENTS

| 4,190,881 | A | * | 2/1980 | Drost et al. .............. 362/249.01 |
| 5,266,738 | A | | 11/1993 | MacVoy |
| 5,599,094 | A | | 2/1997 | Fischer et al. |
| 5,856,721 | A | * | 1/1999 | Gordin et al. .................... 313/25 |
| 5,975,727 | A | | 11/1999 | Morstein et al. |
| 6,523,975 | B1 | | 2/2003 | Plourde et al. |
| 7,108,405 | B2 | | 9/2006 | Matts et al. |
| D596,777 | S | * | 7/2009 | Gordin .......................... D26/63 |
| 7,588,222 | B1 | | 9/2009 | Feldberg |
| 8,303,336 | B2 | | 11/2012 | Smith |
| 8,337,058 | B2 | * | 12/2012 | Gordin et al. ................. 362/427 |
| 8,770,796 | B2 | * | 7/2014 | Gordin et al. ................. 362/263 |

* cited by examiner

*Primary Examiner* — Todd M Epps
(74) *Attorney, Agent, or Firm* — Matthew G. McKinney, Esq.; Allen, Dyer, Doppelt, Milbrath & Gilchrist, P.A.

(57) ABSTRACT

A universal mounting system for a light fixture is disclosed. The system includes a channel adapted to be secured proximate a top end of a light pole, a rotatably adjustable knuckle, a flange disposed on a first end of the knuckle and configured to slidingly engage and seat within the channel, and a mounting plate disposed on a second end of the knuckle and configured to secure to the light fixture. The knuckle includes a first annular portion, where the flange is secured to a periphery of the first annular portion. In addition, the knuckle includes a second annular portion, where the mounting plate is secured to a periphery of the second annular portion and configured to engage the first annular portion and rotate relative to the first annular portion to move the mounting plate to a desired angle to the light pole.

13 Claims, 10 Drawing Sheets

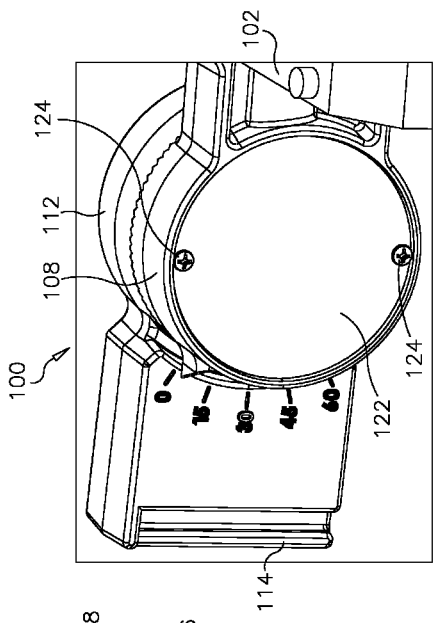
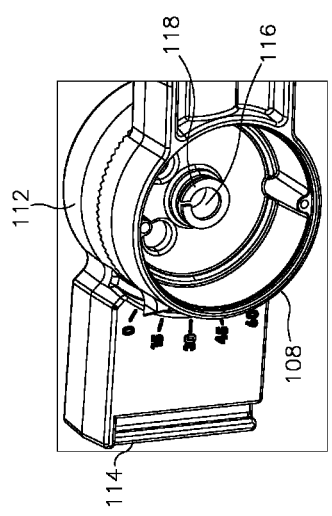
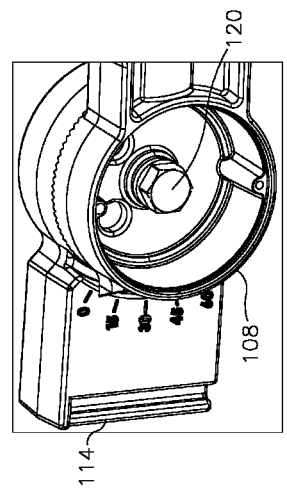

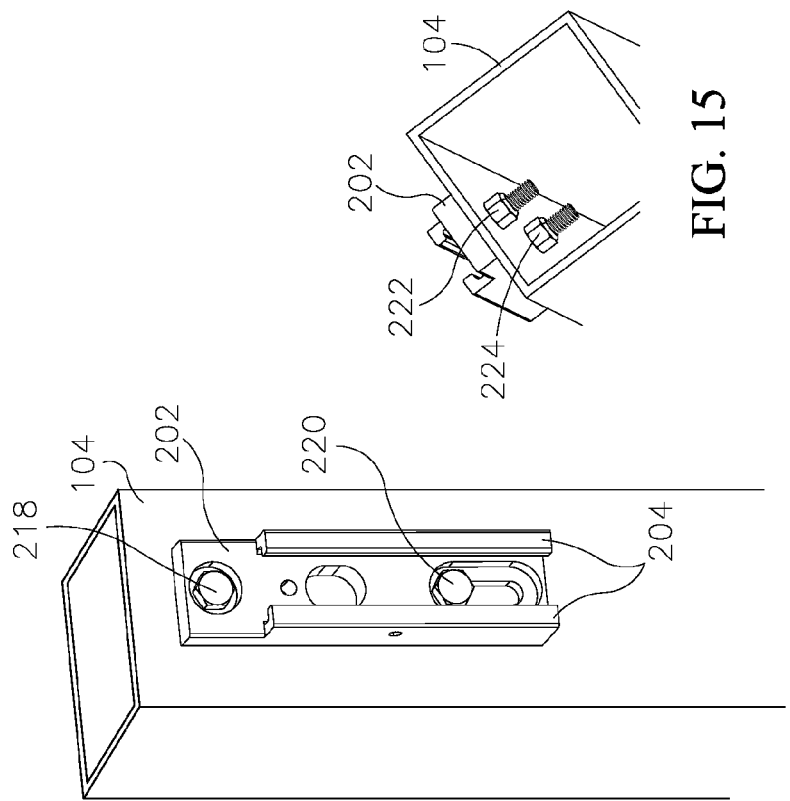
FIG. 15
FIG. 14
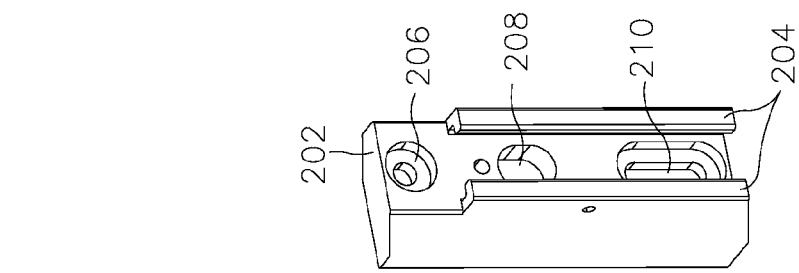
FIG. 13
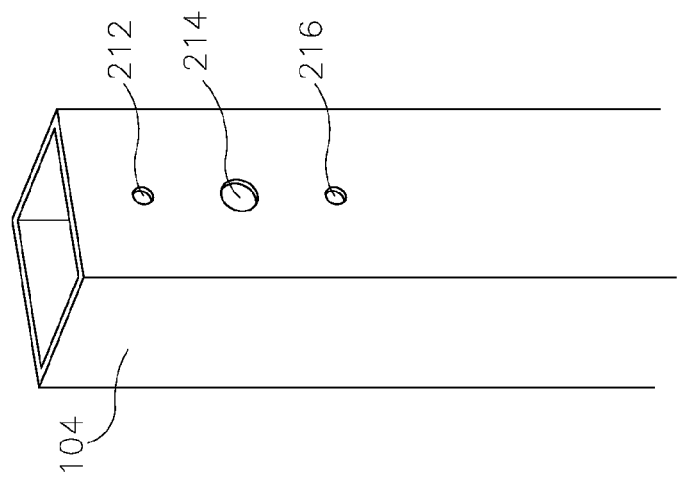
FIG. 12

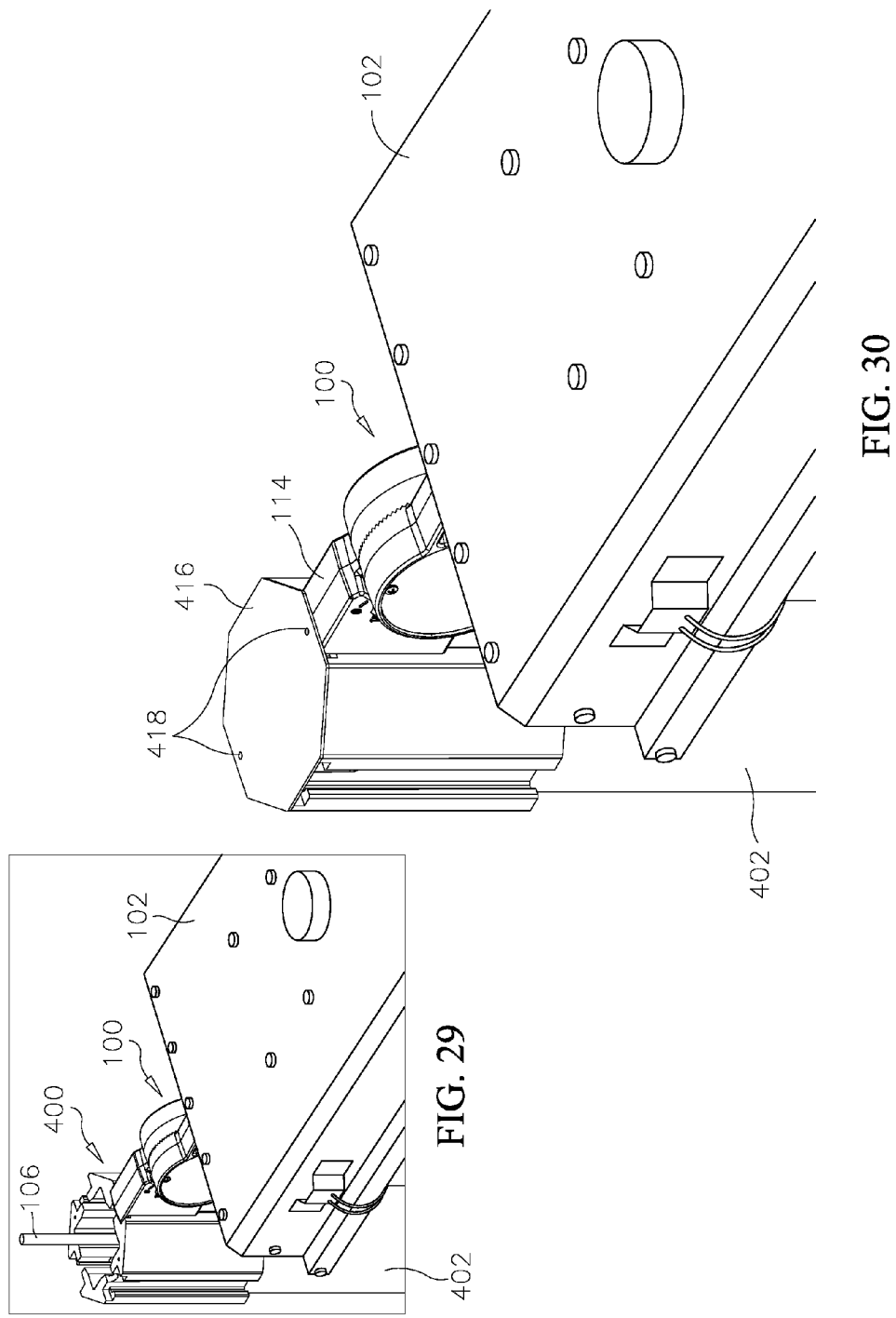

UNIVERSAL MOUNTING SYSTEM FOR A LIGHT FIXTURE

I. FIELD

The present disclosure is generally related to a universal mounting system for a light fixture.

II. DESCRIPTION OF RELATED ART

A light pole is often used to suspend an exterior light fixture high above outdoor areas. Often times a number of light fixtures are secured near a top end of the light pole to provide area lighting for a parking lot or sidewalk, for example. Each light fixture is mounted to the pole using bolts that are intended to resist vibration, movement, or twisting caused by the wind or other forces over the life of the light fixture.

A typical installation procedure includes attaching the light fixture to a mounting assembly which is mounted near a top end of the light pole. An installer may have to drill holes into the light pole and the mounting assembly. Bolts can then be inserted through the holes and anchored in place by nuts or other similar type fasteners to mount the light fixture to the pole and attempt to prevent twisting and movement of the light fixture relative to the light pole.

A shortcoming with the existing mounting systems is that a particular mounting assembly may be designed to fit only one type of light pole with particular dimensions. Thus, the prior art mounting assemblies may be fabricated to precise tolerances to facilitate attaching the mounting assembly to the intended light pole, for example. However, the existing mounting systems are not adapted to fit any shape of light pole such as round, square, or other shapes of poles. In addition, the mounting assemblies may not dampen the vibration and the resulting noise which is generated by the light fixtures. Further, the vibration of the mounting assembly may cause it to become loose relative to the pole so that the light fixture requires replacement or repair.

Another shortcoming with the existing mounting systems is that they require several different tools and a considerable amount of work and time to complete the installation. The installation procedure for the light fixtures is difficult because the light fixtures are typically installed on the light pole after the light pole is mounted in the ground. Accordingly, the installer is required to work high off the ground, which is dangerous and difficult and makes the installation of the light fixtures time consuming.

Accordingly, what is needed in the art is a universal mounting system that allows a user to easily and quickly install light fixtures on any shape or size light pole that was previously unattainable to achieve.

III. SUMMARY

The following presents a simplified summary of one or more embodiments in order to provide a basic understanding of some aspects of such embodiments. This summary is not an extensive overview of the one or more embodiments, and is intended to neither identify key or critical elements of the embodiments nor delineate the scope of such embodiments. Its sole purpose is to present some concepts of the described embodiments in a simplified form as a prelude to the more detailed description that is presented later.

In a particular embodiment, a universal mounting system for a light fixture is disclosed. The mounting system includes a channel adapted to be secured proximate a top end of a light pole, a rotatably adjustable knuckle, a flange disposed on a first end of the knuckle and configured to slidingly engage and seat within the channel, and a mounting plate disposed on a second end of the knuckle and configured to secure to the light fixture. The system may also include a round pole adapter plate configured to be interposed between a round light pole and the flange. A front side of the adapter plate is V-shaped and configured to fit adjacent to an exterior surface of the round pole and a rear side of the adapter plate is flat and configured to fit adjacent the flange.

In another particular illustrative embodiment of a universal mounting system for a light fixture, the system includes a mounting topper configured to slide over a tenon proximate a top end of a light pole and a plurality of channels disposed about the periphery of the mounting topper. The system may also include a rotatably adjustable knuckle, the knuckle having a first annular portion and a second annular portion, where the first annular portion is configured to rotate relative to the second annular portion to move the light fixture to a desired angle to the light pole. A flange may be disposed on a first end of the knuckle and configured to slidingly engage and seat within one of the plurality of channels. In addition, the system may include a mounting plate disposed on a second end of the knuckle and configured to secure to the light fixture. A periphery of an edge of the first and second annular portions each have a plurality of mating teeth configured to engage each other to secure the first and second annular portions together when a bolt is secured to prevent the first and second annular portions for rotating.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

IV. BRIEF DESCRIPTION OF THE DRAWINGS

FIG. 9 is a perspective view of the knuckle with a lock washer;

FIG. 10 is a perspective view of the knuckle clamped together at a desired inclination angle using a bolt;

FIG. 11 is a perspective view of a cap secured over the knuckle;

FIG. 12 is a partial perspective view of a square light pole that can be used with the mounting system;

FIG. 13 is a perspective view of a channel of the mounting system that may be used with a square pole, round pole, or a pole with a tenon;

FIG. 14 is a perspective view of the channel secured to the square light pole;

FIG. 15 is a top perspective view of an inside of the square light pole with the channel installed with bolts;

FIG. 29 is a perspective view of the knuckle slid into a channel of the tenon topper; and FIG. 30 is a close-up perspective view of the knuckle shown in FIG. 29 with the lid installed over the tenon topper.

IV. DETAILED DESCRIPTION

The word "illustrative" is used herein to mean "serving as an example, instance, or illustration." Any embodiment or design described herein as "illustrative" is not necessarily to be construed as preferred or advantageous over other embodiments or designs.

Figure 1:
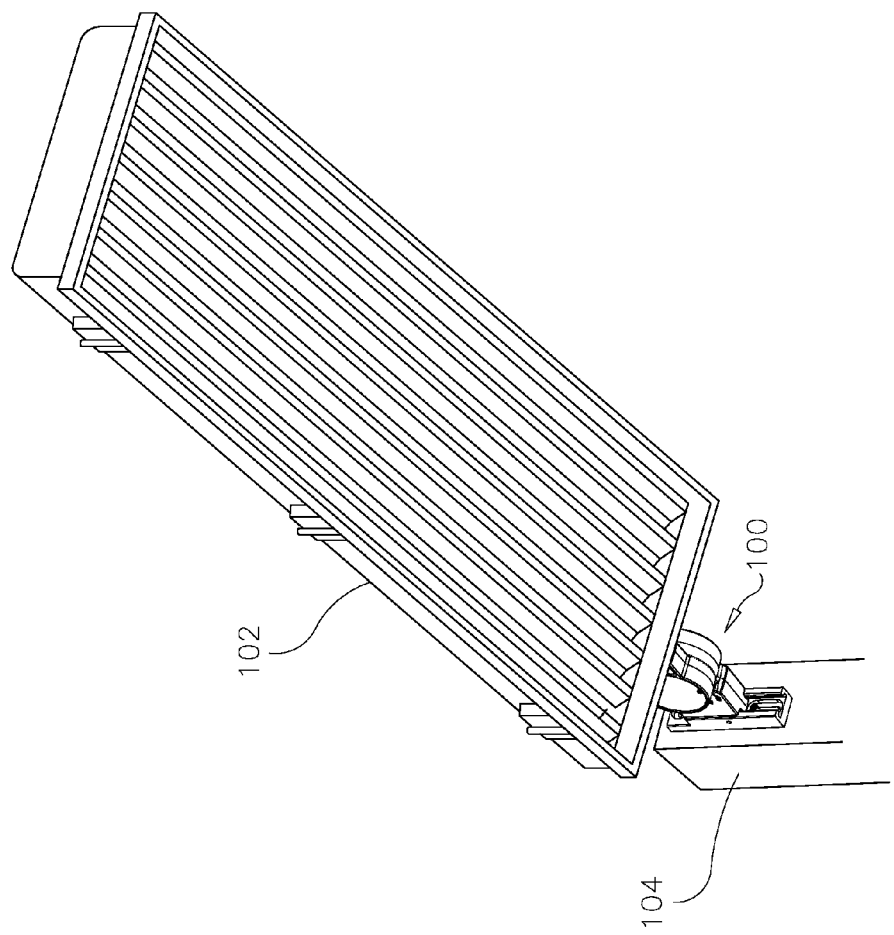
FIG. 1 is a perspective view of a particular illustrative embodiment of a universal mounting system for a light fixture.

Referring now to FIG. 1, a particular illustrative embodiment of a universal mounting system for a light fixture is shown installed. For example, the system includes a rotatably adjustable knuckle 100 adapted to secure a light fixture 102 to a square light pole 104. In this particular embodiment shown in FIG. 1, the light fixture 102 is end mounted and rectangular in shape. However, the system can be used with any shape light fixture or light pole. In addition, the system can be mounted to a building or any type of structural support and not limited to be mounted to a light pole.

Figure 2:
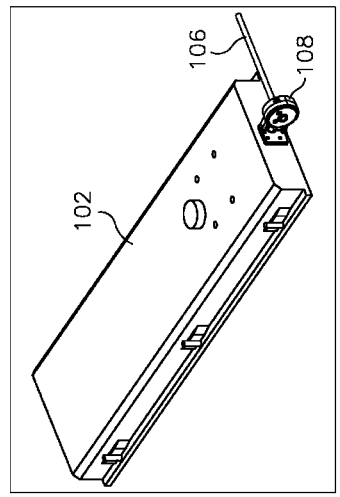
FIG. 2 is a perspective view of a first component of the mounting system secured to the light fixture.

Referring now to FIG. 2, the system may be shipped to the site partly assembled with the light fixture 102. Accordingly, access to the light fixture 102 is unnecessary and reduces the amount of time of installation of the light fixture 102 to the light pole 104. For example, the system may be shipped with a first annular portion 108 of the knuckle 100 secured to the light fixture 102 with the electrical cable 106 from the light fixture 102.

Figure 3:
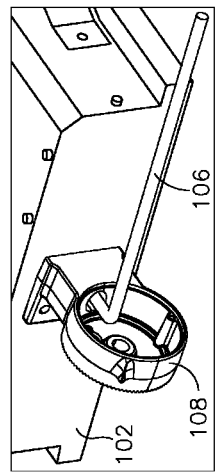
FIG. 3 is a close-up view of the first component of the mounting system shown in FIG. 2.
Figure 4:
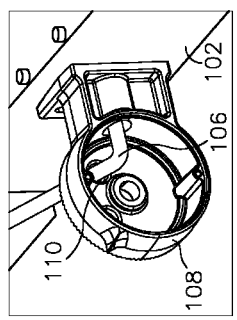
FIG. 4 is a perspective view of an electrical cable from the light fixture threaded through the first component of the mounting system shown in FIG. 3.

The installation of the light fixture 102 begins with assembling the knuckle 100. As shown in FIGS. 3 and 4, a close-up view of the first annular portion (or component) 108 is shown and illustrates that the electrical cable 106 is threaded in through the first annular portion 108 from the light fixture 102 and out through an aperture 110 in the back side of the first portion 108.

Figure 5:
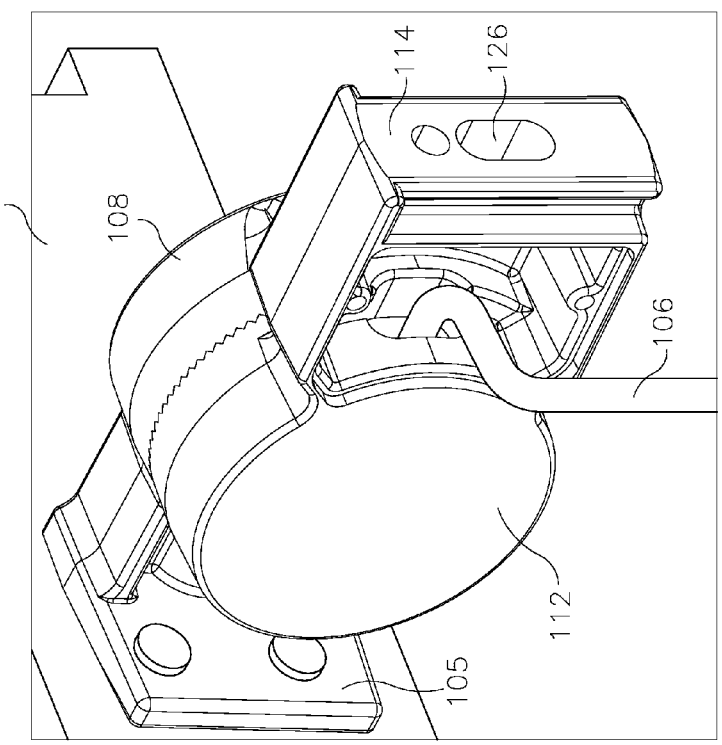
FIG. 5 is a perspective view of a knuckle of the mounting system.

Referring now to FIG. 5, a second annular portion 112 of the knuckle 100 is secured to the first annular portion 108. The second portion 112 includes a passageway for the electrical cable 106 to be threaded through and out the knuckle 100. When the first portion 108 and the second portion 112 are secured together, a flange 114 extends outward and from a periphery of the first annular portion 108. A mounting plate 105 is secured to a periphery of the second annular portion 112, where the first 108 and second annular portions 112 are configured to engage and rotate relative to each other to move the mounting plate 105 and light fixture 102 to a desired angle to the light pole 104. The first annular portion 108 may also include an annular plate 122 that is configured to be removably secured to a periphery of the first annular portion 108, wherein the interior of the knuckle 100 is accessible when the annular plate 122 is removed. A periphery of an edge of the first 108 and second annular portions 112 each have a plurality of mating teeth configured to engage each other to secure the first 108 and second annular portions 112 together when the bolt 120 is secured to prevent the first 108 and second annular 112 portions for rotating.

Figure 6:
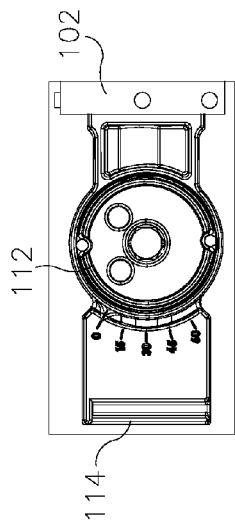
FIG. 6 is an elevational view of the knuckle at a 0 degree inclination angle.
Figure 7:
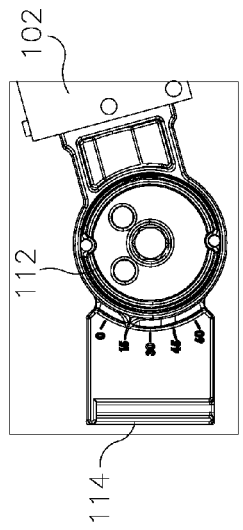
FIG. 7 is an elevational view of the knuckle at a 15 degree inclination angle.
Figure 8:
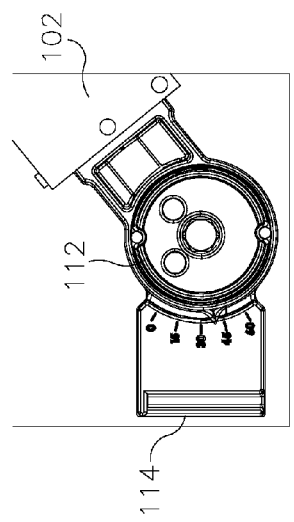
FIG. 8 is an elevational view of the knuckle at a 40 degree inclination angle.

The knuckle 100 is configured to be rotated to a desired inclination angle as shown in FIGS. 6-8, such as 0, 20, or 40 degrees. The inclination angle is to adjust the angle of the light fixture 102 relative to the light pole 104 or structural support. A mounting plate 105 is disposed on a second end of the knuckle 100 and configured to secure to the light fixture 102. A conduit aperture is configured for the electrical cable 106 to pass from the light pole 104 to an interior of the first annular portion 108 of the knuckle 100.

Once the knuckle 100 is set to the desired inclination angle, a lock washer and a bolt 120 inserted through a center hole 116 in the first portion 108 and second portion 112 can be tightened as shown in FIGS. 9 and 10. A circular plate 122 can be secured over the open end of the first portion 108 with a plurality of screws 124, as shown in FIG. 11. The bolt 120 is disposed at an axis of rotation for the first 108 and second annular portions 112.

To receive the knuckle 100 and light fixture 102, a channel 202 is secured to the light pole 104. Referring now to FIGS. 12-15, the light pole 104 includes an upper hole 212, a hole for the electrical cable 214, and a lower hole 216. The channel 202 includes holes 206, 208, 210 to align with the holes 212, 214, 216. In addition, the channel 202 includes a pair of tangs 204 that are configured to secure and seat the flange 114 therein. A pair of bolts 218, 220 are used to secure the channel 202 to the square light pole 104. Accessing the light pole 104 from an open top end, a pair of nuts 222, 224 are placed over a respective end of the bolts 218, 220 and tightened.

Figure 16:
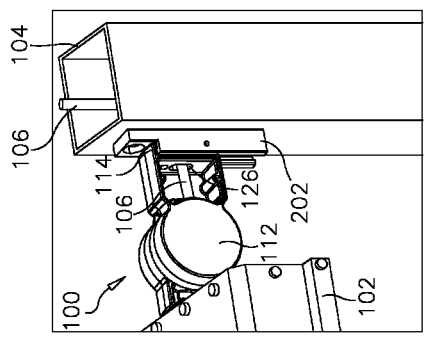
FIG. 16 is a perspective view of the knuckle positioned to slide into the channel secured to the square pole.
Figure 17:
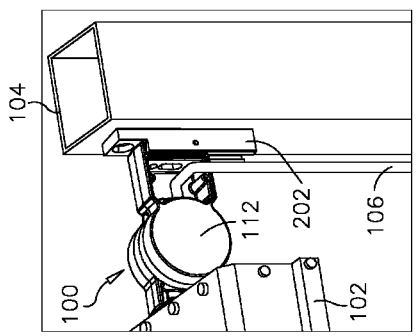
FIG. 17 is a perspective view of the knuckle slid into the channel.
Figure 18:
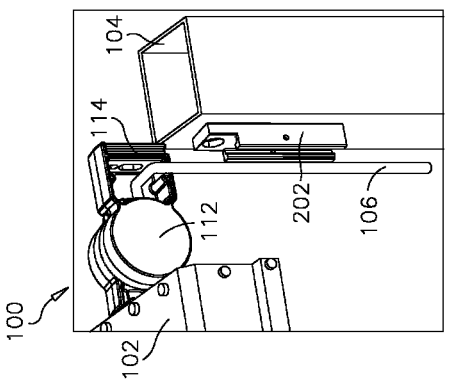
FIG. 18 is a close-up view of the knuckle and channel shown in FIG. 17 with the electrical cable threaded into the interior of the pole.
Figure 21:
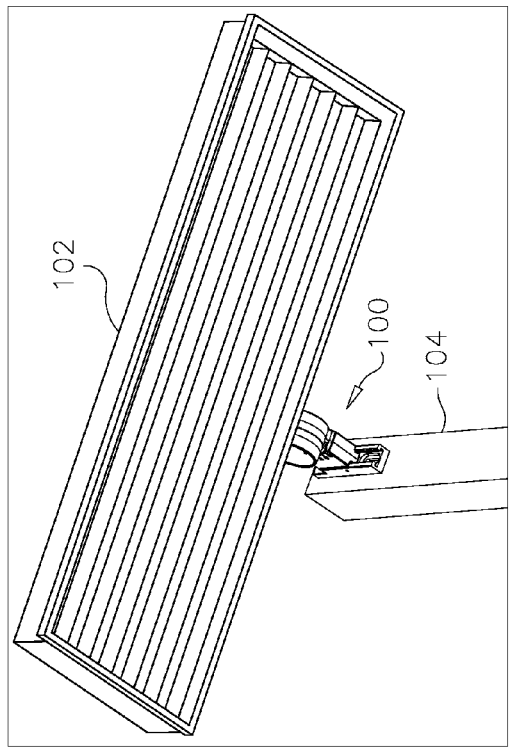
FIG. 21 is a perspective view of the universal mounting system used with a center mounted light fixture.
Figure 19:
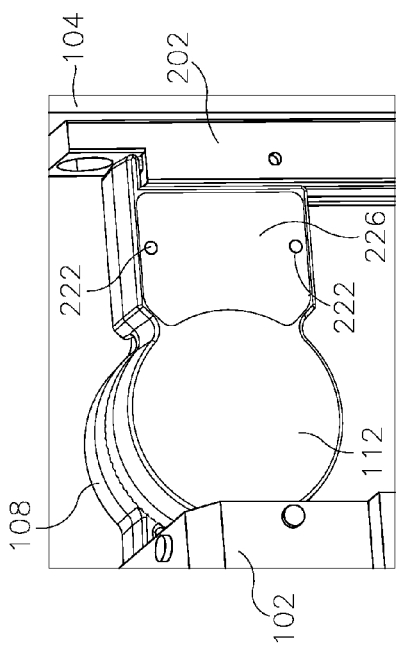
FIG. 19 is a close-up view of the knuckle shown in FIG. 18 with a cover installed over a wire compartment of the knuckle.
Figure 20:
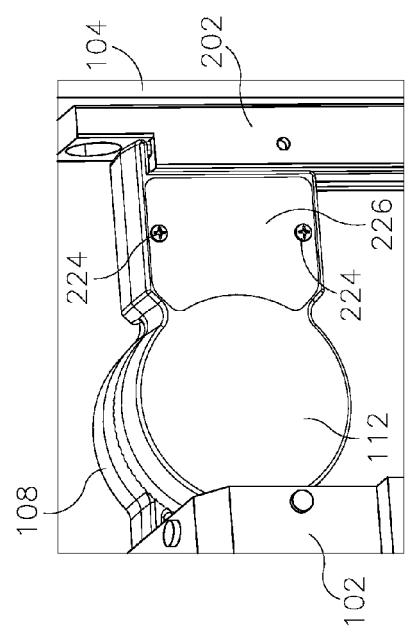
FIG. 20 is a close-up view of the cover secured with screws.
Figure 25:
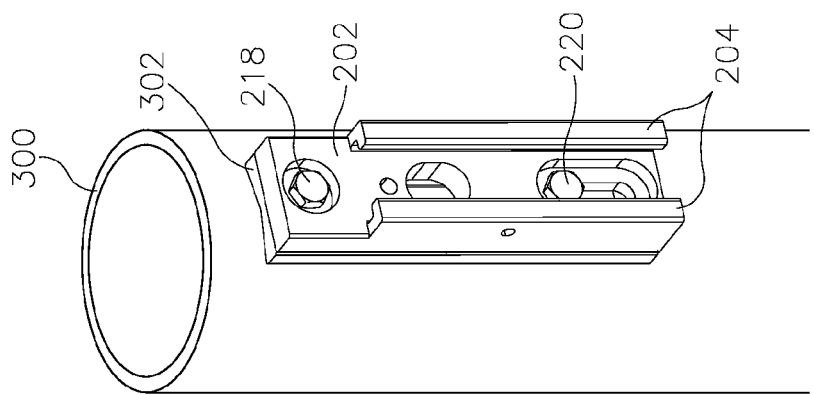
FIG. 25 is a top perspective view of the round pole adapter and channel secured to the round light pole.
Figure 24:
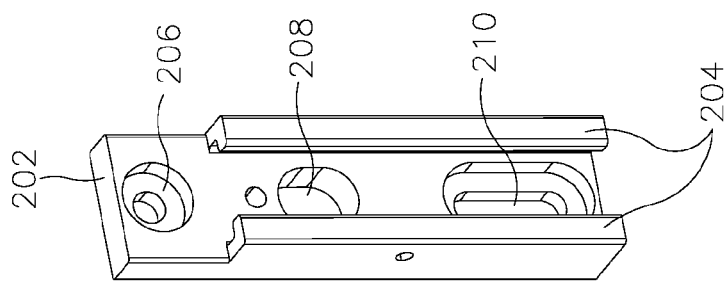
FIG. 24 is a perspective view of the channel used with the round pole adapter.
Figure 23:
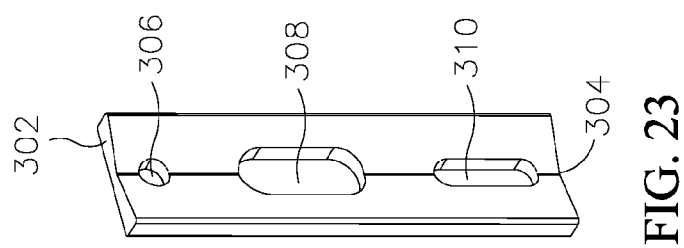
FIG. 23 is a perspective view of a round pole adapter used with the mounting system.
Figure 22:
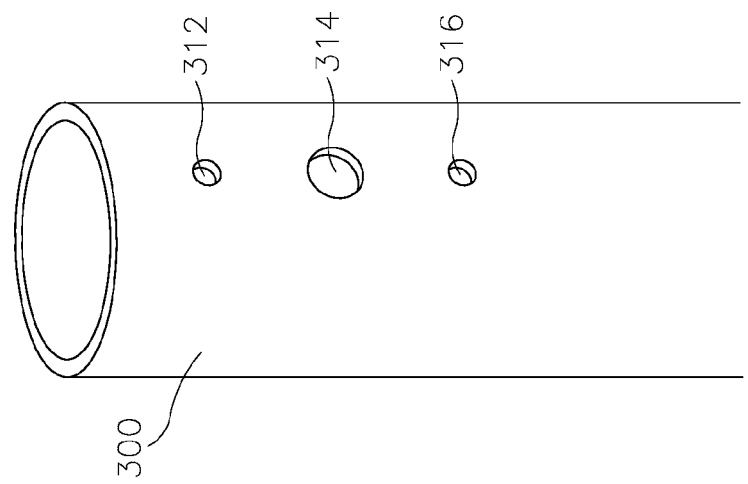
FIG. 22 is a partial perspective view of a round light pole that can be used with the mounting system.
Figure 28:
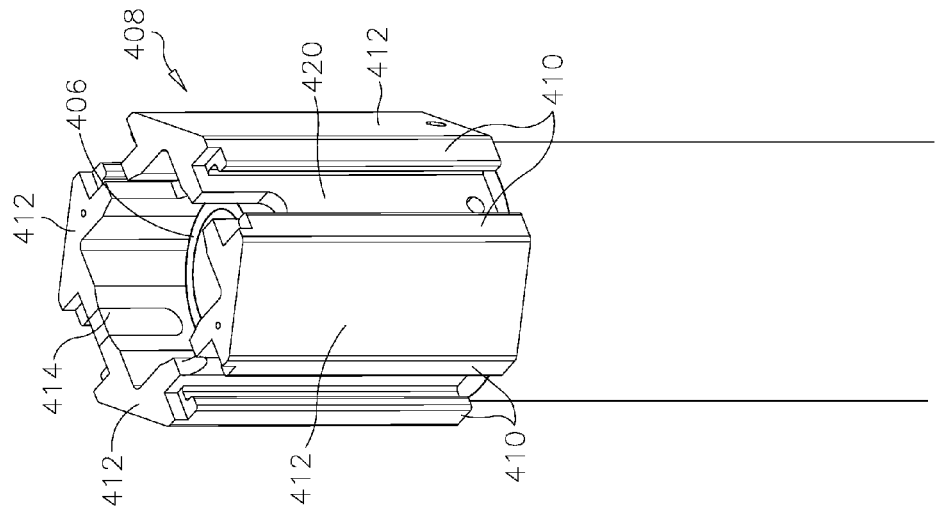
FIG. 28 is a perspective view of the tenon topper secured to the tenon of the light pole.
Figure 27:
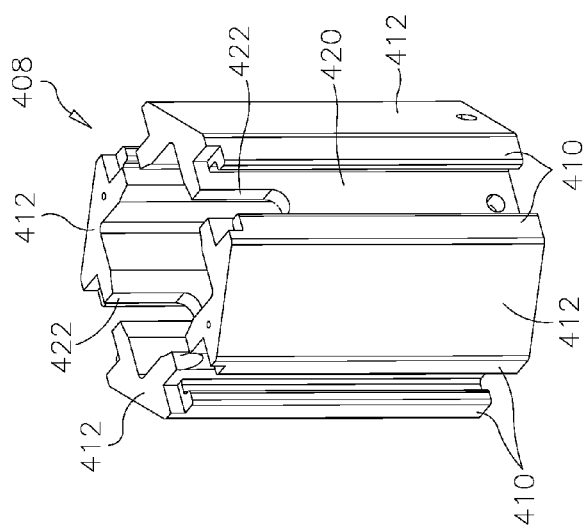
FIG. 27 is a perspective view of a tenon topper.
Figure 26:
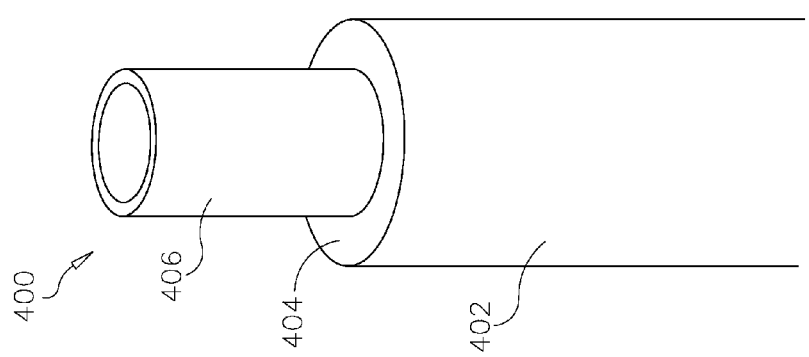
FIG. 26 is a partial perspective view of a round light pole with a tenon that can be used with the mounting system.

With the channel 202 secured to the light pole 104 and the knuckle 100 secured to the light fixture 102, the light fixture 102 is ready to be installed on the light pole 104. Referring now to FIGS. 16-18, the flange (e.g., T-shaped) 114 is aligned with the channel 202, which is secured to the light pole 104. The light fixture 102 is lowered so that the flange 114 slides down the channel and the tangs 204 secure and seat the flange 114 within the channel 202. The electrical cable 106 is threaded out the hole 126 of the flange 114, through hole 208 of the channel, and through hole 214 to the inside of the light pole 104. Typically, the power source is located inside the light pole 104 and is adapted to be connected to and in electrical communication with the electrical cable 106 of the light fixture 102. A plate 226 is then secured with screws 224 over an opening of the second portion 112 of the knuckle 100 to completely enclose the knuckle 100, as shown in FIGS. 19-20. The light fixture 102 may also be center-mounted to the knuckle 100 as shown in FIG. 21, rather than end mounted.

The system can also be easily used and adapted to install a light fixture to a round light pole 300 as shown in FIGS. 22-25. For example, there is no change in mounting the knuckle 100 to the light fixture 102 as explained above for a square pole but rather the use of a V-shaped adapted plate 302 is required. The adapter plate 302 is configured to be interposed between the round light pole 300 and the channel 202, where a front side of the adapter plate 302 is V-shaped and configured to fit adjacent to an exterior surface of the round pole 300 and a rear side of the adapter plate 302 is flat and configured to fit adjacent the channel 202. In use, the V-shaped side of the adapter plate 302 is placed against the surface of the round pole 300, where an opposing side of the adapter plate 302 is flat. Accordingly, the adapter plate 302 is sandwiched between the channel 202 and the round pole 300 and secured to the round pole with bolts 218, 220 through holes 306, 310 of the adapter plate and 206, 210 of the channel 202. Similar to installing the light fixture 102 to a square pole 104, the light fixture 102 is lowered so that the flange 114 slides down the channel and the tangs 204 secure and seat the flange 114 within the channel 202. The electrical cable 106 is threaded out the hole 126 of the flange 114 of the knuckle 100, through hole 208 of the channel, through hole 308 of the adapter plate 302, and through hole 314 to the inside of the light pole 300.

In another particular illustrative embodiment shown in FIGS. 26-30, the system may be used to install a light fixture 102 to a pole 400 with a tenon 406. The diameter of base 402 of the pole 400 has a diameter that steps down to a smaller diameter of the tenon 406 that forms a ledge 404 between the base 402 and the tenon 406. A tenon topper 408 is configured to slide over the tenon 406 and rest on the ledge 404, which prevents the topper 408 from sliding down the pole 400. Similar to the channel 202 described above, the topper 408 has a plurality of channels 420, where each channel 420 has a pair of tangs 410. Intermediate plates 412 are disposed between the channels 420, where the topper 408 may include four channels 420 to mount up to four light fixtures 102. Within each channel 420, a cable slot 422 is disposed so that the electrical cable 106 from the light fixture 106 can be threaded through the slot 422 to the interior of the pole 400. In addition, plugs 414 may be provided to slide into the slot(s) 422 that are not used. A lid 416 can be installed over the topper 408 with screws 418, to enclose the topper 408 and protect the electrical cable 106 and associated electrical connections.

The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A universal mounting system for a light fixture, the system comprising:
    a channel adapted to be secured proximate a top end of a light pole;
    a rotatably adjustable knuckle;
    a flange disposed on a first end of the rotatably adjustable knuckle and configured to slidingly engage and seat within the channel;
    a mounting plate disposed on a second end of the rotatably adjustable knuckle and configured to secure to the light fixture;
    a first annular portion, wherein the flange is secured to a periphery of the first annular portion;
    a second annular portion, wherein the mounting plate is secured to a periphery of the second annular portion and configured to engage the first annular portion and rotate relative to the first annular portion to move the mounting plate to a desired angle to the light pole;
    the flange having a conduit aperture configured for an electrical cable to pass from the light pole to an interior of the first annular portion; and
    the first annular portion having an annular plate configured to be removably secured to a periphery of the first annular portion, wherein the interior of the rotatably adjustable knuckle is accessible when the annular plate is removed.

2. The system of claim 1, the knuckle further comprising a bolt to secure the first and second annular portions together, wherein the bolt is disposed as an axis of rotation for the first and second annular portions.

3. The system of claim 2, wherein a periphery of an edge of the first and second annular portions each have a plurality of mating teeth configured to engage each other to secure the first and second annular portions together when the bolt is secured to prevent the first and second annular portions for rotating.

4. The system of claim 3, an interior of the first and second annular portions having a plurality of apertures to pass the electrical cable therethrough from the first annular portion to the second annular portion.

5. The system of claim 4, second annular portion further comprising a supply conduit configured to pass the electrical cable from the second annular portion to the mounting bracket and the light fixture.

6. The system of claim 5, further comprising a round pole adapter configured to be interposed between a round light pole and the flange, wherein a front side of the adapter is V-shaped and configured to fit adjacent to an exterior surface of the round pole and a rear side of the adapter is flat and configured to fit adjacent the flange.

7. The system of claim 6, the channel further comprising an elongated tang on each sidewall of the channel to guide and secure the flange within the channel.

8. The system of claim 7, wherein a backwall of the channel further comprising at least one slot configured to pass the electrical cable from the light pole.

9. The system of claim 5, wherein a cross section of the light pole is square.

10. A universal mounting system for a light fixture, the system comprising:
    a rotatably adjustable knuckle having a first annular portion and a second annular portion, and configured to slidingly engage and seat within a channel mounted proximate a light pole, wherein the rotatably adjustable knuckle is configured for an electrical cable to pass from the light pole to an interior of the rotatably adjustable knuckle;
    a mounting plate disposed on a second end of the rotatably adjustable knuckle and configured to secure to the light fixture, wherein the mounting plate is configured to rotate relative to the first annular portion to move the mounting plate to a desired angle to the light pole; and the knuckle having a removable access plate that is configured to be removed to access the interior of the rotatably adjustable knuckle to make necessary electrical connections to the light fixture.

11. The system of claim 10, the rotatably adjustable knuckle further comprising a bolt to secure the first and second annular portions together, wherein the bolt is disposed as an axis of rotation for the first and second annular portions.

12. The system of claim 11, wherein a periphery of an edge of the first and second annular portions each have a plurality of mating teeth configured to engage each other to secure the first and second annular portions together to prevent the first and second annular portions for rotating.

13. The system of claim 11, further comprising a round pole adapter configured to be interposed between a round light pole and the knuckle, the adapter having a pair of elongated legs, wherein a front side of the adapter is V-shaped and configured to fit adjacent to an exterior surface of the round pole and a rear side of the adapter is flat and configured to fit adjacent the knuckle.

* * * * *